Mar. 3, 1925.

W. B. BRONANDER 1,528,363

ROLLER BEARING

Filed Oct. 1, 1921    2 Sheets-Sheet 1

Fig. 1,

Inventor
Wilhelm B. Bronander.
By his Attorney
E. W. Marshall

Mar. 3, 1925.

W. B. BRONANDER

ROLLER BEARING

Filed Oct. 1, 1921

INVENTOR
Wilhelm B. Bronander.
BY
E. W. Marshall
ATTORNEY

Patented Mar. 3, 1925.

1,528,363

UNITED STATES PATENT OFFICE.

WILHELM B. BRONANDER, OF MONTCLAIR, NEW JERSEY.

ROLLER BEARING.

Application filed October 1, 1921. Serial No. 504,589.

*To all whom it may concern:*

Be it known that I, WILLIAM B. BRONANDER, a citizen of the United States, and a resident of Montclair, Essex County, and State of New Jersey, have invented certain new and useful Improvements in Roller Bearings, of which the following is a specification.

The objects of my present invention are to provide a roller bearing of simple, sturdy construction; which will be self-alining; in which the rollers will be so guided and confined as to properly carry the load at all times, and which will be so constituted as to carry the thrust as well as radial loads.

A further special object is to provide simple and effective means to compensate for any irregularities in the running of the rollers and to hold them properly spaced at all times.

These objects are attained in the constructions disclosed in the accompanying drawings, which are to be considered as illustrative of forms the invention may take.

In the drawings referred to:

Figure 1:
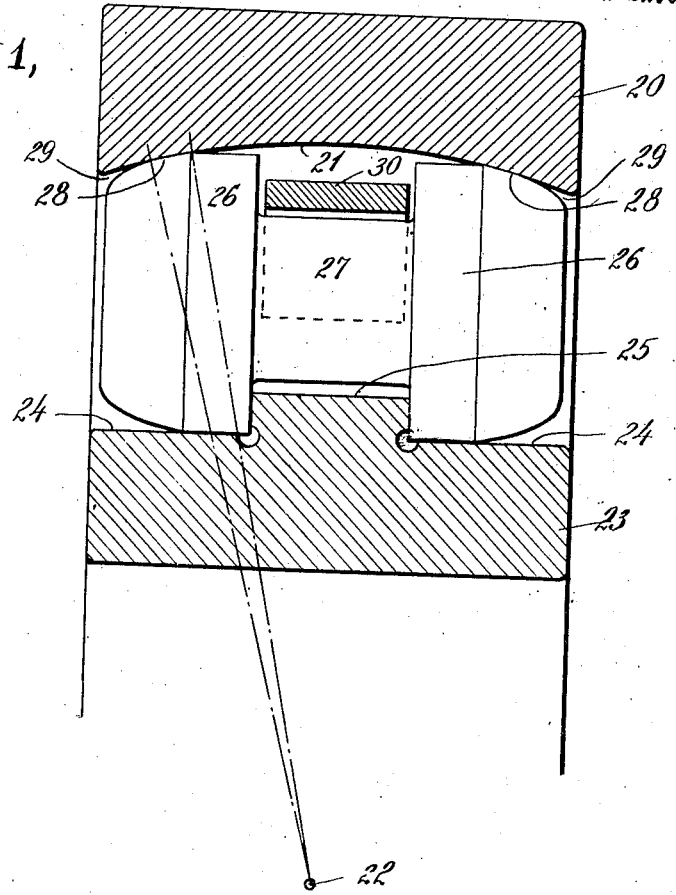
Figure 1 is a cross sectional view of the upper half of a bearing constructed in accordance with and embodying certain novel features of the invention.

The outer bearing member is shown in the form of a race ring 20 having a concave bearing track 21 struck on an arc whose center corresponds with the center 22 of the bearing.

The inner race ring 23 is shown as constructed with plain cylindrical tracks 24 and with an intermediate outstanding annular rib 25.

This rib constitutes a means for guiding the rollers against lateral displacement, said rollers being of the "dumb-bell" type, with cylindrical portions 26 to ride on the cylindrical tracks 24 and a reduced neck or shank portion 27 to pass over the top of the guide rib.

The head portions of the rollers outside or beyond the cylindrical parts 26 have the spherical portions 28 to ride on the concave track of the outer bearing member. The outer ends of these ball shaped portions may be reduced or cut away, as I have indicated at 29, to limit the area of contact between the rollers and the outer bearing track.

In the first form of the invention shown, that is, in Figure 1, the rollers are indicated as spaced by a retainer 30 engaging over the reduced shank portions of the rollers, but in the later forms, as shown particularly in Figures 3 and 5, the rollers are spaced by rolling elements shown in the form of balls 70 riding on the ribs 25 and engaged between the reduced shanks 27 below or inward of the centers of the rollers. These balls by engagement with the shanks hold the rollers properly spaced and the shank portions of the rollers overstanding the balls as they do serve to prevent the balls from working outward.

Figure 2:
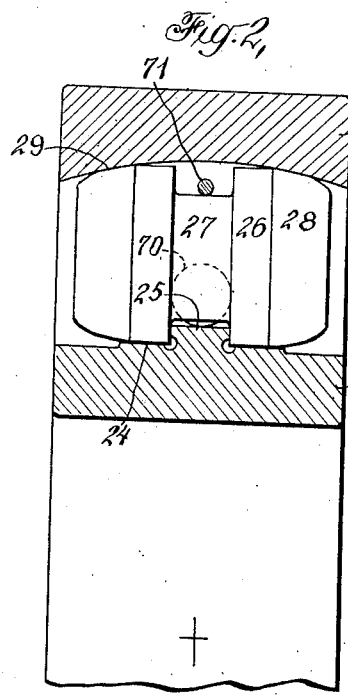
Figure 2 is a similar view on a slightly reduced scale, showing the bearing as equipped with spacing balls between the bearing rollers.
Figure 3:
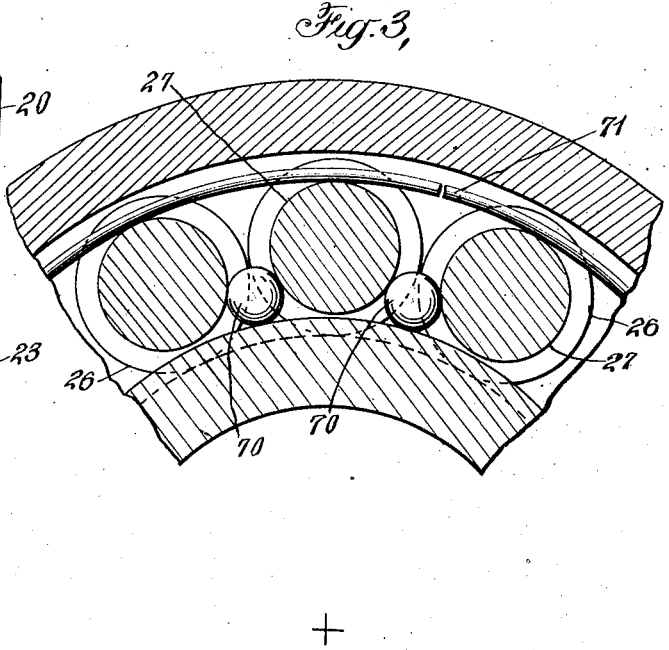
Figure 3 is a broken sectional view taken on a plane at right angles to the plane of Figure 2.

In the form shown in Figures 2 and 3 I have provided a split spring ring retainer 71 encircling the reduced portions of the rollers for confining the rollers to the inner bearing member.

Figure 4:
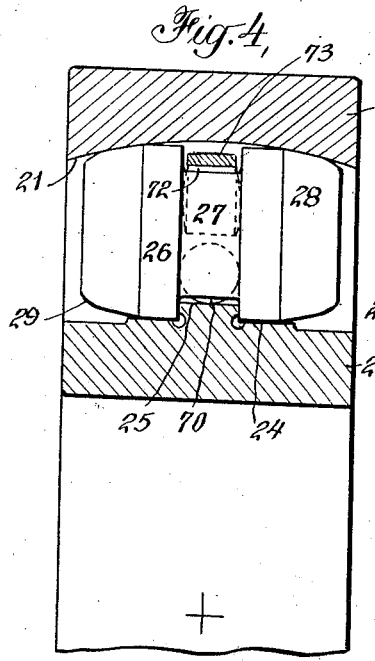
Figures 4 and 5 are views similar to Figures 2 and 3, showing the bearing modified to the extent of providing spacing rollers in addition to the spacing balls and using a retainer in the form of a band instead of the plain split ring first shown.
Figure 5:
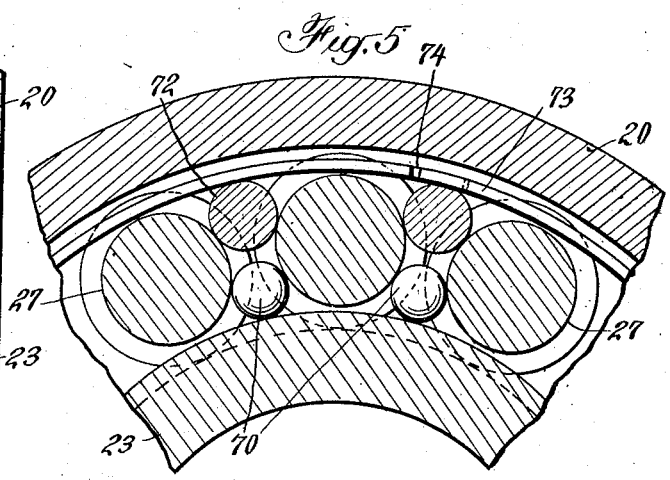

In the structure disclosed in Figures 4 and 5, additional rolling spacer elements are interposed between the bearing rollers, in the form of small spacer rollers 72 engaged with the shank portions of the bearing rollers outside the centers thereof and held yieldingly in place by an encircling split band 73 having a lap or scarf joint at 74 to present a continuous surface to the elements which it confines.

An especial advantage of the structure last described is that the spring band by its yielding pressure on the spacing rollers enables said elements to compensate for irregularities in the rolling action of the bearing rollers, said spacing rollers yielding outwardly at one time and working inwardly at another time as the bearing rollers vary in their turning movements.

It will be seen that a bearing constructed in accordance with my invention is both simple and practical, is self-alining and carries the thrust as well as the radial loads.

What I claim is:

1. A roller bearing comprising outer and inner race members, the outer member having a spherical bearing surface having the center of the bearing as its center and the inner race member having cylindrical bearing surfaces and rollers disposed between said race members having spherical bearing portions engaging said spherical bearing surface of the outer race member, and cylindrical portions engaging the surfaces of the inner race member.

2. A self centering roller bearing comprising outer and inner race members, the outer race member having a spherical bearing surface and the inner race member having a cylindrical bearing surface and rollers disposed between the race members and having surfaces corresponding in curvature to the curvature of the outer race member and having other surfaces cylindrical and engaging the inner race member.

3. A self centering roller bearing comprising outer and inner race members, the outer race member having a spherical bearing surface and the inner race member having a cylindrical bearing surface and rollers disposed between the race members and having surfaces corresponding in curvature to the curvature of the outer race member and having other surfaces cylindrical and engaging the inner race members, and means carried by the inner race member for guiding and retaining the rollers in position.

In witness whereof, I have hereunto set my hand this 29th day of Sept., 1921.

WILHELM B. BRONANDER.